United States Patent Office 3,326,935
Patented June 20, 1967

3,326,935
(2-AMINO-1-HYDROXYETHYL)-
THIANAPHTHENES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Jan. 7, 1964, Ser. No. 336,130
6 Claims. (Cl. 260—330.5)

This invention relates to novel (2-amino-1-hydroxyethyl)-thianaphthenes having useful pharmacodynamic activity. More specifically the compounds of this invention block beta adrenergic receptors and thus have anti-anginal and anti-arrhythmic utility. This activity is demonstrated by blockade of chronotropic effects of epinephrine on the heart.

The novel compounds of this invention are represented by the following general structural formula:

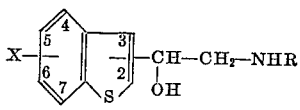

FORMULA I in which:
X represents hydrogen or chlorine, preferably in the 5-position; and
R represents isopropyl, tertiary butyl, allyl or cyclopropyl.

The 2-amino-1-hydroxyethyl side chain in the compounds of Formula I above is preferably in the 2-position of the thianaphthene nucleus.

This invention also includes acid addition salts of the above defined amino compounds formed with nontoxic pharmaceutically acceptable organic and inorganic acids. Such salts are easily prepared by methods known to the art. The amine is reacted with either the calculated amount of organic or inorganic acid in an aqueous miscible solvent, such as ethanol or acetone, with isolation of the salt by concentration and cooling, or an excess of the acid in an aqueous immiscible solvent, such as ethyl ether or chloroform, with the desired salt separating directly. Exemplary of such organic salts are those formed with maleic, fumaric, benzoic, ascorbic, pamoic, succinic, methanesulfonic, cyclohexyl sulfamic, acetic and tartaric acids. Exemplary of such inorganic salts are those formed with hydrochloric, hydrobromic, sulfuric and phosphoric acids. Of course these salts may also be prepared by the classical method of double decomposition of appropriate salts which is well-known to the art.

The (2-amino-1-hydroxyethyl)-thianaphthenes of this invention are prepared according to the following synthetic scheme:

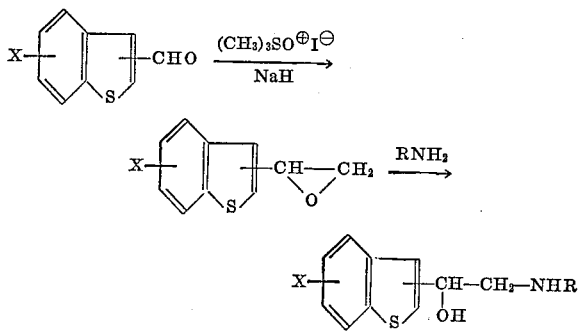

The thianaphthaldehyde is reacted with a reagent formed from trimethylsulfoxonium iodide. The latter in the presence of a strong base such as sodium hydride forms a reactive substance called dimethylsulfoxonium methylide,

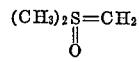

which produces the thianaphthenyl ethylene epoxide shown above. Reaction of the epoxide with appropriate amines furnishes the (2-amino-1-hydroxyethyl)-thianaphthene products.

The foregoing is a general description of the synthetic route for the preparation of the compounds of this invention. The following examples serve to illustrate the synthetic procedures in more detail but are not to be construed as limiting the scope of the invention.

Example 1

A solution of 16.5 g. of trimethylsulfoxonium iodide in 100 ml. of dimethylsulfoxide is stirred under nitrogen as 3.35 g. of 53.8% sodium hydride/mineral oil is added in portions with the temperature maintained at 20–30° C. After evolution of hydrogen is stopped, a solution of 11.0 g. of 2-thianaphthaldehyde in 50 ml. of dimethylsulfoxide is added slowly, maintaining the temperature below 35° C. The resulting solution is stirred at room temperature for 30 minutes and then at 55–60° C. for one and one-half hours. The solution is poured into cold water/ether and the layers separated. The dried ether layer is evaporated in vacuo, the residue taken up in acetonitrile and washed with petroleum ether. The acetonitrile solution is diluted with ether, dried and evaporated in vacuo to give a residual oil, (2-thianaphthenyl) ethylene oxide, B.P. 107–113° C./0.3 mm.; M.P. 50–58° C.

A solution of 5.8 g. of the above ethylene oxide and 2.37 g. of isopropylamine in 100 ml. of methanol is allowed to stand at room temperature overnight. The solution is stirred and refluxed for three hours and then evaporated in vacuo to give 2-(2-isopropylamino-1-hydroxyethyl)-thianaphthene; hydrochloride salt, M.P. 217–219° C.

Similarly, employment of equivalent amounts of 3-thianaphthaldehyde, 5-chloro-2-thianaphthaldehyde or 5-chloro-3-thianaphthaldehyde in the above sequence of reactions results in the corresponding 3-(2-isopropylamino-1-hydroxyethyl)-thianaphthene, 5-chloro-2-(2-isopropylamino-1-hydroxyethyl)-thianaphthene or 5-chloro-3-(2-isopropylamino-1-hydroxyethyl)-thianaphthene, respectively.

The thianaphthaldehyde starting materials are prepared according to procedures described in J. Amer. Chem. Soc., 74, 2935 (1952) and J. prakt. Chem. 138, 109 (1933).

EXAMPLE 2

A solution of 8.0 g. of (2-thianaphthenyl) ethylene oxide and 2.6 g. of cyclopropylamine in 250 ml. of methanol is allowed to stand overnight at room temperature. The solution is then stirred and refluxed for three hours and evaporated in vacuo. The residue is dissolved in ether and extracted with dilute hydrochloric acid. The acid extract is washed with ether, made basic and extracted with ether. The ether extract is washed with a saturated salt solution, dried and evaporated in vacuo. The residue is dissolved in alcohol, acidified with hydrogen chloride/ether and diluted with ether to give 2-(2-cyclopropylamino-1-hydroxyethyl)-thianaphthene hydrochloride, M.P. 160–170° C.

EXAMPLE 3

A solution of 8.0 g. of (2-thianaphthenyl) ethylene oxide and 3.3 g. of tertiary butylamine in 250 ml. of methanol is allowed to stand overnight at room temperature and then refluxed for three hours. Evaporation in vacuo leaves a residue which is dissolved in ether and extracted with dilute hydrochloric acid. The acid extract is washed with ether, made basic and extracted with ether. The ether extract is washed with a saturated salt solution, dried and evaporated in vacuo. The residue is dissolved in alcohol, acidified with hydrogen chloride/ether and diluted with ether to give 2-(2-tertiary butylamino-1-hydroxyethyl)-thianaphthene hydrochloride, M.P. 211–212.5° C.

Similarly, reaction of (2-thianaphthenyl) ethylene oxide with an equivalent amount of allylamine as described above yields the corresponding 2-(2-allylamino-1-hydroxyethyl)-thianaphthene hydrochloride.

What is claimed is:

1. A chemical compound selected from the group consisting of a free base and a nontoxic pharmaceutically acceptable acid addition salt thereof, said free base having the structural formula:

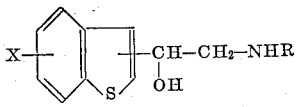

in which:

X is a member selected from the group consisting of hydrogen and chlorine; and

R is a member selected from the group consisting of isopropyl, tertiary butyl, allyl and cyclopropyl.

2. A chemical compound having the structural formula:

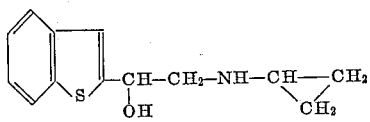

3. A chemical compound having the structural formula:

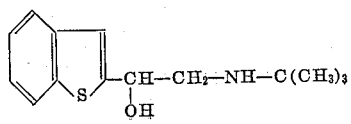

4. A chemical compound having the structural formula:

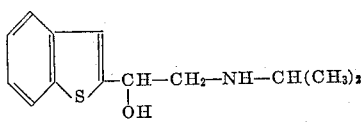

5. A chemical compound having the structural formula:

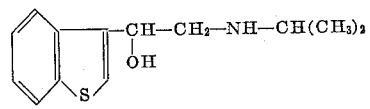

6. A chemical compound having the structural formula:

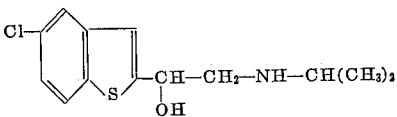

References Cited

Corey, E. J., and Michael Chaykovsky, Journal of the American Chemical Society, 84, 867 (1962).

Malinkovskii, M. S.: Epoxides and Their Derivatives, Israel Program for Scientific Translations, Jerusalem, 1965 (p. 216).

WALTER A. MODANCE, *Primary Examiner.*

CECILIA M. SHURKO, *Assistant Examiner.*